United States Patent Office 3,484,911
Patented Dec. 23, 1969

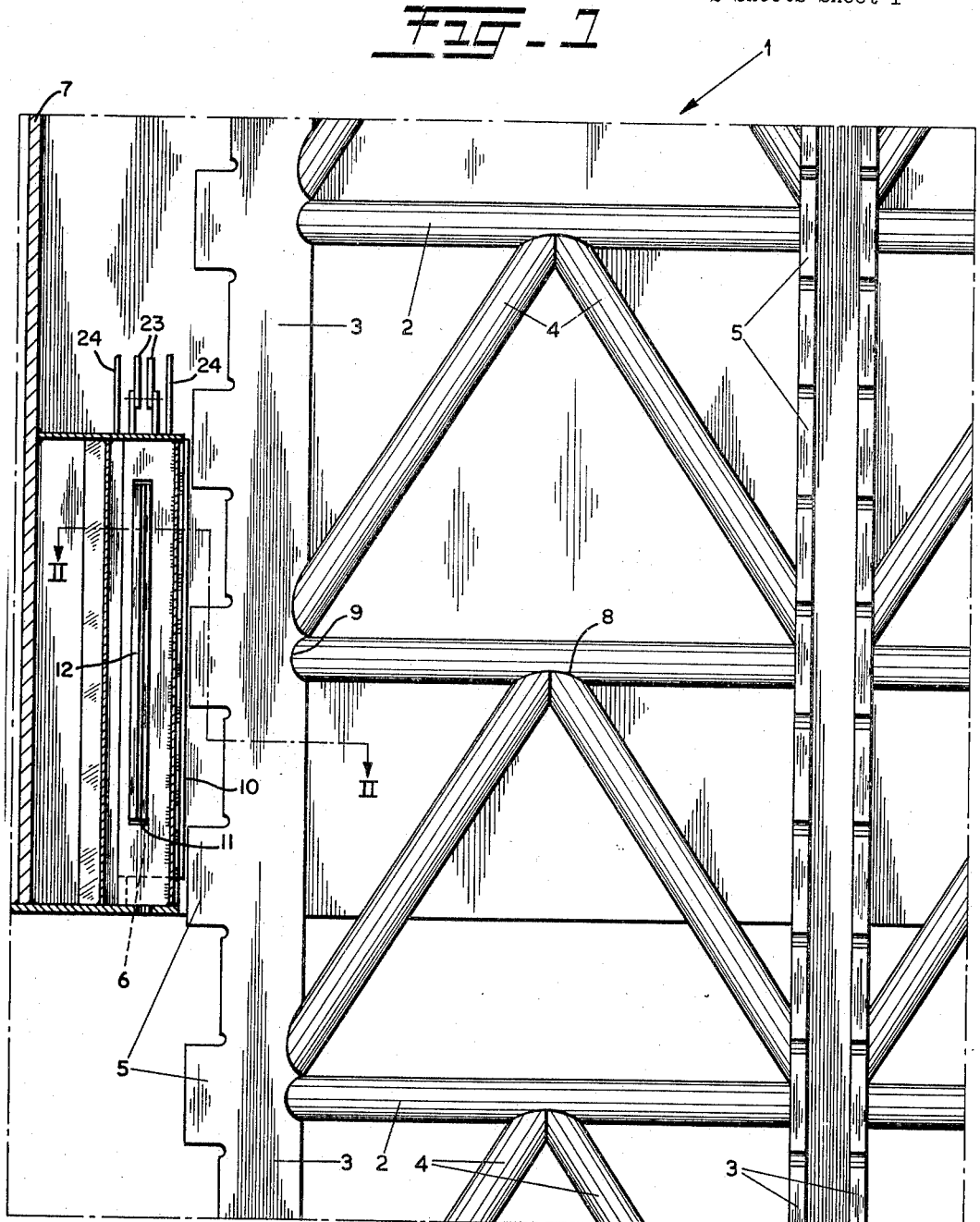

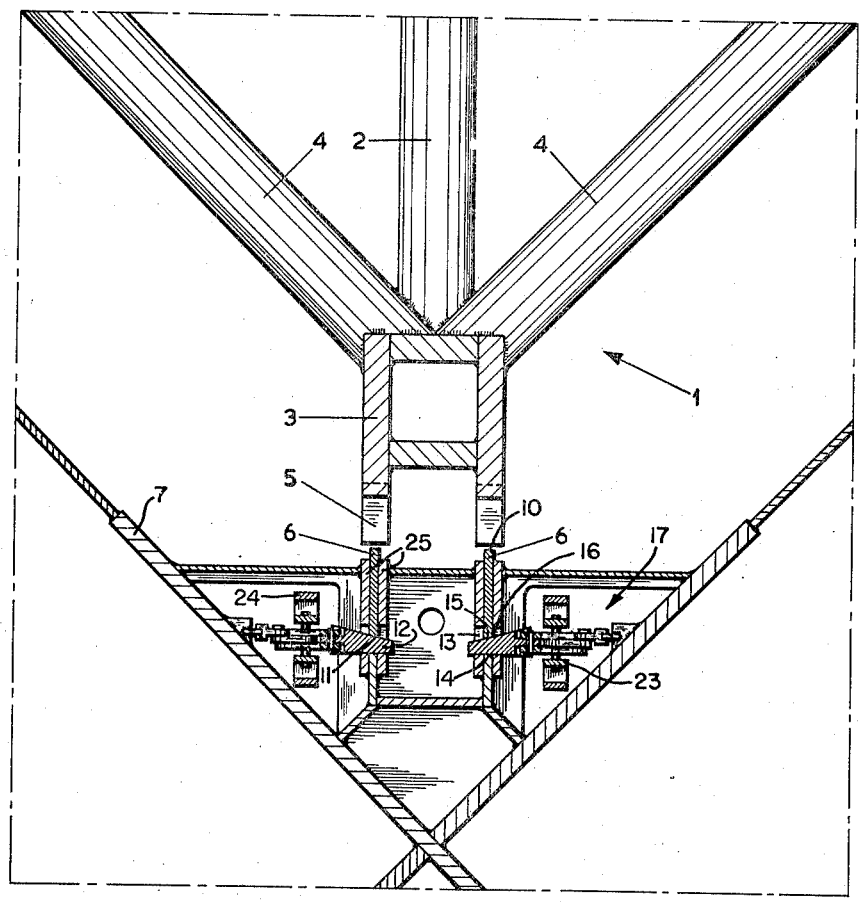

3,484,911
RELATIVELY VERTICALLY DISPLACEABLE BODY AND COLUMN
August Hendrik Maria Smulders, Wassenaar, Netherlands, assignor to N.V. Werf Gusto v/h Firma A.F. Smulders, Schiedam, Netherlands
Filed Nov. 29, 1967, Ser. No. 686,672
Claims priority, application Netherlands, Dec. 27, 1966, 6617717
Int. Cl. E02b 17/04
U.S. Cl. 24—263                                          10 Claims

ABSTRACT OF THE DISCLOSURE

An upright column and a body encompassing the column are vertically displaceable relative to each other. The column is of the open lattice type in which a plurality of parallel elongated members are rigidly interconnected at spaced points. At least one series of regularly vertically spaced teeth is carried by the column and certain of those teeth are disposed at the levels of those points of interconnection. A pressure member is movable toward and away from at least one of those certain teeth with the tooth contacting midway of the height of the pressure member and the pressure member contacting the teeth that are immediately above and below that certain tooth. The preferred vertical length of the pressure member is twice the tooth pitch, which in turn is equal to the pitch between the said points of interconnection.

---

The present invention relates to an upright column and a body encompassing the column, in combination with means for eliminating the space between the body and the column. The body and the column are vertically movable relative to each other and may for example be a drilling platform and an associated pile. The invention will be described and illustrated in connection with this latter embodiment, it being understood that it is of broader application.

One example of columns and bodies suitable for use in the present invention, and the apparatus for moving them vertically relative to each other, is to be found in U.S. Patent No. 3,372,907, Mar. 12, 1968. An example of apparatus for eliminating the space between the column and the body is found in U.S. Patent No. 3,362,054, Jan. 8, 1968. The disclosure of these patents is incorporated by reference in the present application, so as to avoid unnecessary duplication.

In apparatus of the type of the present invention, a pressure member carried by the body exerts a horizontal force on a tooth located on the column, thereby to eliminate the space between the body and the column. In the past, however, difficulty has been encountered in that the column tends to be bent so that the tooth is pushed inwardly and the horizontal force of the pressure member is thus not fully transmitted.

It is an object of the present invention to eliminate this disadvantage and to enable the full horizontal force of the pressure member to be applied in an optimum fashion to at least one tooth.

Briefly, this object is achieved by regulating the structure of the column and the vertical extent and registry of the pressure member with the teeth on the column.

The invention will be disclosed more fully hereinafter, with reference to the accompanying drawings, in which:

FIGURE 1 is a fragmentary side elevational view of a portion of structure according to the present invention; and FIGURE 2 is a cross section taken on the line II—II of FIG. 1.

Referring now to the drawings in greater detail, there is shown a column according to the present invention in the form of a drilling rig pile indicated at 1, which is encompassed by a body, which in the illustrated embodiment is a drilling platform 7. Piles and platforms of this type are commonly used in offshore drilling, it being necessary to move said platform 7 and said pile 1 vertically relative to each other during the course of emplacing or removing the drilling rig. This for instance then can be done as described in detail in the above-mentioned U.S. Patent No. 3,372,907 and need not be described in detail here. When the pile 1 and the platform 7 are in a stationary position relative to each other, it is necessary to eliminate the space between the platform 7 and the pile 1. According to the above-mentioned U.S. Patent No. 3,362,054, this is done by moving a pressure member toward the wall of a pile by means of a mechanism described in detail in that patent. However, when a pile is of the open lattice type, the present invention provides a predetermined ratio between the pitch of the teeth, the length of the pressure member, and the distance between two adjacent transverse ties of the pile.

According to the embodiment shown in the figures, the pile is comprised of a plurality of parallel vertical members 3 rigidly interconnected by horizontal transverse ties 2. Diagonals 4 rigidly interconnect the midpoints 8 of the ties 2 which are disposed at the periphery of the pile and the points 9 of interconnection between the ties 2 and the vertical members 3.

A plurality of outwardly extending teeth 5 are disposed in at least one regularly spaced series along at least one vertical member 3 for registering with the drive means disclosed in the above-mentioned U.S. Patent No. 3,372,907. However, in the present invention these same teeth 5 are also used in connection with mechanism for eliminating the space between the pile 1 and its encompassing body 7, as disclosed in the above-mentioned U.S. Patent No. 3,362,054. In this connection it will be noted from the drawings that every other tooth is located at the level of the point 9 of interconnection of the ties 2 and diagonals 4 with the vertical member 3. Thus any horizontal thrust exerted on certain of these teeth is transmitted directly through the ties 2 and to a lesser extent through the diagonals 4.

The means for eliminating the space between the piles and its encompassing body comprise a pressure member 6 having a vertically disposed bearing surface 10 which confronts the teeth 5.

In pressure member 6 a slit 11 is present in which a wedge 12 is positioned. The pressure member is guided between two plates 25 fixed to the body of the platform 7. In each of said plates a further slit 13 is provided in line with slit 11. The dimensions of the slits 13 are such that when the wedge is moved, the wedge 12 contacts along one side 14 the edge of the slits 13 and along its other side contacts the edge 15 of the pressure member 6 but, during this movement, is free from edge 16 of the slits 13. During this movement, therefore, the pressure member 6 is moved in the direction of the teeth 5 until said pressure member contacts said teeth 5.

The above-mentioned movement of said wedge is obtained by a lever system indicated generally at 17. Lever system 17 is actuated by rods 23 and 24 and may include any conventional or well-known linkage. Rods 23 and 24 can be moved downwardly as seen in FIG. 1 by a mechanism which for example can be a differential mechanism as described in the above-mentioned U.S. Patent No. 3,362,054, by which it is possible to cause the pressure member 6 along its whole length to contact the teeth 5 when the pile 1 has an inclined position in relation to the platform 7. When said rods 23 and 24 are moved downwardly, the system 17 is actuated so that the wedge 12 is moved. As a result of this, the pressure member is moved in the direction of the teeth 5. When the pressure member 6 contacts said teeth 5 completely, the space between pile 1 and platform 7 is eliminated. When one end of the pressure member 6 contacts one tooth 5 but the other end still is at a distance from the other tooth, the drive of rods 23 and 24 is such that the movement of the corresponding rod is continued until the pressure member contacts the teeth along its whole length.

In said U.S. Patent No. 3,362,054, the drive mechanism for the pressure member is coupled to said pressure member at a point between the ends of said pressure member so the pressure member is able to rock about said point to adapt its position to the position of the pile.

Having described my invention, I claim:

1. Apparatus comprising an upright column, a body encompassing the column, the column having a plurality of outwardly extending regularly spaced teeth thereon disposed in a series parallel to its length, the teeth having flat upright outermost surfaces thereon, a rigid, unitary pressure member carried by the body and movable toward and away from the teeth, the pressure member having a flat upright pressure surface that bears against said outermost surfaces of the teeth, and means for movng the pressure member into and out of contact with the teeth, the pressure member having a vertical extent such that it extends above and below at least one said tooth that it contacts.

2. Apparatus as claimed in claim 1, the vertical extent of said pressure member being at least the pitch of said teeth.

3. Apparatus as claimed in claim 2, said vertical extent being about twice the tooth pitch.

4. Apparatus as claimed in claim 2, the pressure member contacting one said tooth about midway of the vertical extent of the pressure member.

5. Apparatus as claimed in claim 4, the pressure member contacting other said teeth above and below said one tooth.

6. Apparatus as claimed in claim 1, said column comprising a plurality of parallel vertical members on at least one of which said teeth are disposed, and further members disposed at a substantial angle to the vertical and rigidly interconnecting said vertical members to form an open lattice column, the points of connection of at least some of said further members being at the same level as said one tooth.

7. Apparatus as claimed in claim 6, the pressure member contacting said one tooth about midway of the vertical extent of the pressure member and contacting other said teeth above and below said one tooth.

8. Apparatus as claimed in claim 7, said vertical extent being about twice the tooth pitch.

9. In apparatus comprising an upright column, a body encompassing the column, the column having a plurality of outwardly extending regularly spaced teeth thereon disposed in a series parallel to its length, the column comprising a plurality of parallel vertical members on at least one of which said teeth are disposed, further members disposed at a substantial angle to the vertical and rigidly interconnecting said vertical members to form an open lattice column, a pressure member carried by the body and movable toward and away from the teeth, and means for moving the pressure member into and out of contact with the teeth; the improvement in which the pitch of the teeth, the distance between said further members of said open lattice column, and the length of said pressure member are such that the holding force of the pressure member is taken directly by the connections of said further members which interconnect said vertical members to form an open lattice column.

10. Apparatus as claimed in claim 9, in which the distance between said further members is equal to twice the pitch of the teeth, and said pressure member having a length such that it contacts neither more nor less than three teeth when one said tooth is disposed midway of the length of the pressure member.

References Cited

UNITED STATES PATENTS

| | | | |
|---|---|---|---|
| 2,967,400 | 1/1961 | Grant et al. | 61—46.5 |
| 3,343,371 | 9/1967 | Heitkamp. | |
| 3,362,054 | 1/1968 | Splinter. | |
| 3,367,119 | 2/1968 | Rybicki | 61—46.5 |
| 3,372,907 | 3/1968 | Smulders et al. | 254—110 |

DONALD A. GRIFFIN, Primary Examiner

U.S. Cl. X.R.

61—46.5; 254—110